Patented Dec. 31, 1929

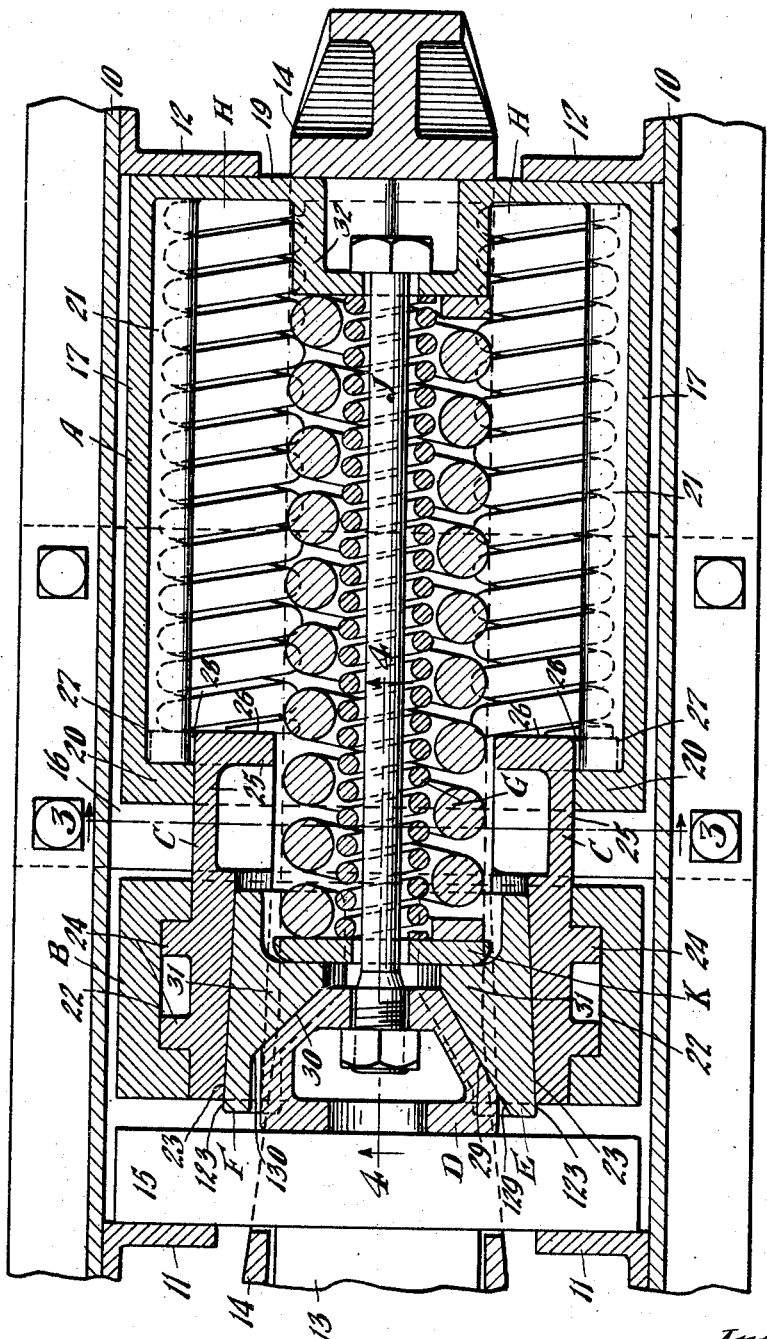

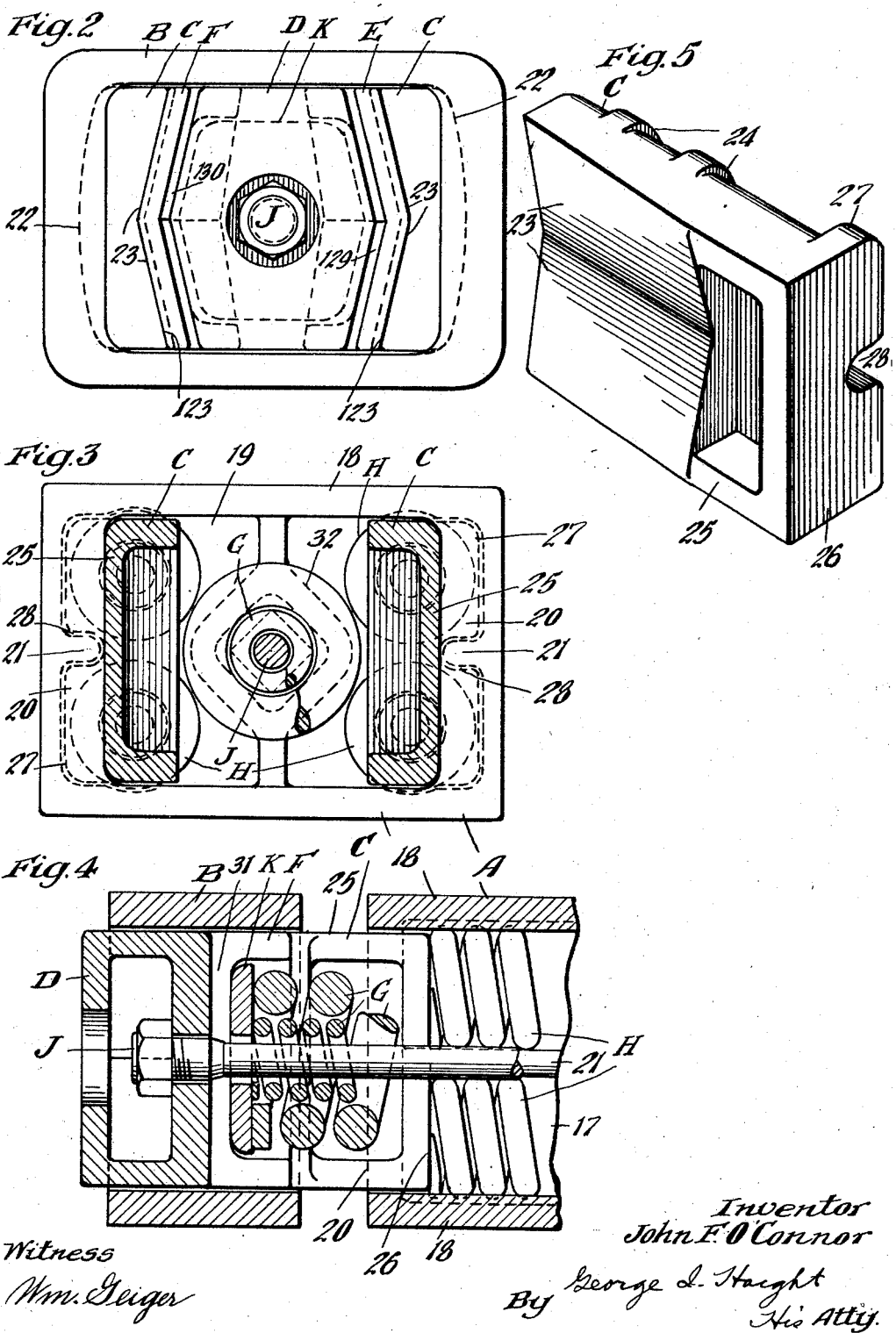

1,742,004

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Application filed September 6, 1927. Serial No. 217,810.

This invention relates to improvements in friction shock absorbing mechanisms.

One object of the invention is to provide a friction shock absorbing mechanism specially adapted for railway draft riggings having high free spring capacity to absorb the usual shocks to which the mechanism is subjected in service and frictional resistance to absorb unusually heavy shocks, wherein the mechanism includes a spring cage, a friction shell having limited relative movement, the friction shell having friction means co-operating therewith, the relative movement of the shell and cage being spring resisted, and the friction means being relatively movable with respect to the friction shell, when movement of the latter is arrested with respect to the cage, relative movement of the friction means and shell being yieldingly resisted by spring means.

A still further object of the invention is to provide a friction shock absorbing mechanism affording free spring action during the first part of the compression stroke, to absorb the lighter shocks to which the mechanism is subjected, followed by frictional resistance during the remainder of the compression stroke, to take care of the heavier shocks, including a spring cage and friction shell which are relatively movable to a limited extent during the first part of the compression stroke, a friction means relatively movable with respect to the shell during the remainder of the compressed stroke, to produce the heavier resistance wherein simple and efficient, readily removable and renewable means, having friction surfaces, is provided for anchoring the friction shell to the cage, whereby the friction surfaces of the shell may be renewed when worn out without the destructive effect to the shell, and wherein relative movement of the friction shell and cage is resisted by a plurality of spring elements, certain of which also oppose relative movement of the friction means and friction shell.

A more specific object of the invention is to provide a mechanism of the character indicated, including a spring cage and friction shell having limited relative movement, the friction shell having friction means cooperating therewith and spring resistance means within the cage, including central elements, and additional elements surrounding the central elements wherein the entire spring resistance means opposes relative movement of the shell and cage, and the central element alone opposes relative movement of the shell and friction means after relative movement of the shell and cage has been arrested.

Further objects and advantages of the invention will more fully and clearly appear from the description and claims hereinafter following.

In the drawings forming part of this specification Fig. 1 is a horizontal longitudinal sectional view of the portion of the railway draft rigging illustrating my improvements in connection therewith. Fig. 2 is a front end elevational view of the shock absorbing mechanism proper. Fig. 3 is a vertical transverse sectional view corresponding substantially to the line 3—3 of Fig. 1. Fig. 4 is a longitudinal vertical sectional view of the forward end portion of the shock absorbing mechanism proper corresponding substantially to the line 4—4 of Fig. 1, and Fig. 5 is a detailed perspective view of an anchoring liner element employed in connection with my improved shock absorbing mechanism. In said drawings 10—10 indicate the usual channel shaped center or draft sills of a railway car underframe, to the inner sides of which are secured front stop lugs 11—11 and rear stop lugs 12—12. The inner end of the drawbar is indicated by 13, to which is operatively connected a yoke 14, of well known form, within which is disposed the shock absorbing mechanism proper and the front main follower 15. The yoke is operatively supported by a detachable saddle plate 16, secured to the draft sills.

My improved shock absorbing mechanism proper comprises, broadly, a spring cage A; a friction shell B; two anchoring liners C—C; a main wedge D; two friction shoes E and F; spring resistance means, including a central element G, and four additional elements H—H, surrounding the central element; a retainer bolt J, and a spring follower disc K.

The spring cage A is in the form of a substantially rectangular box-like casing having spaced longitudinally extending side walls 17—17, spaced longitudinally extending horizontal top and bottom walls 18—18, and a transverse vertical rear end wall 19. The end wall 19 co-operates with the rear stop lugs 12 in the manner of the usual rear follower. The side walls 17 of the casing A are interned at the forward end, as indicated by 20, thereby presenting vertically disposed stop walls or abutments which co-operate with the anchoring liners C, in a manner hereinafter pointed out, to hold the parts assembled. The side walls are reinforced interiorly by longitudinally extending centrally disposed ribs 21, formed integrally with the side walls. In addition to forming reenforcing means for the side walls, the ribs 21, also serve to space the top and bottom members of the outer coils of the spring resistance.

The friction shell B is also in the form of a substantially rectangular box-like casing, which is open at both the front and rear ends. Side walls of the friction shell are relatively thick, as most clearly shown in Fig. 1, and are recessed as indicated at 22, to provide interior seats adapted to co-operate with retaining means on the liners to secure the liners to the friction shell.

The liners C are of a similar design and, as most clearly shown in Figures 1 and 5, each of the liners is provided with a longitudinally disposed friction surface 23 of V shaped section on the inner side thereof. On the outer side each liner is provided with a pair of spaced vertically extending ribs 24—24. The ribs 24 are adapted to seat in the recess 22 of the corresponding side wall of the friction shell B, to anchor the liner C to the friction shell against longitudinal movement. As most clearly shown in Fig. 1, the liners C are anchored to the opposed side walls of the friction shell B, and have their friction surfaces 23 opposed and converged inwardly of the mechanism. The liners C are provided with rearward extensions 25, which are telescoped within the spring cage A. As most clearly illustrated in Figures 1 and 5, the rear end portions of the liners C present relatively wide flat abutment faces 26, which co-operate with the outer coils of the spring resistance H. Each of the liners C is also provided with a lateral outwardly projecting flange 27, at the rear end thereof, adapted to engage in back of the abutment wall 20, at the corresponding side of the spring cage to thereby limit outward movement of the liner with respect to the cage and anchor the friction shell B to the cage for limited movement. As clearly shown in Fig. 5, the flange 27 of each liner is centrally slotted, as indicated at 28, to accommodate the corresponding re-enforcing rib 21, of the cage A.

The wedge member D is in the form of a relatively heavy block having a flat front end face bearing directly on the main follower 15. At the inner end the block D is provided with a pair of wedge faces 29 and 30, on the opposite sides thereof, the wedge face 29 being disposed at a relatively keen wedging angle with respect to the longitudinal axis of the mechanism, and the wedge face 30 being disposed at a relatively blunt releasing angle with respect to said axis. As most clearly shown in Fig. 2, each of the wedge faces 29 and 30, are of V shaped section for the purpose hereinafter pointed out.

The friction shoes E and F, which are two in number, and disposed at opposite sides of the mechanism, are of similar design except as hereinafter pointed out. Each of the friction shoes is provided with an outer friction surface 123 of V shaped section, adapted to co-operate with the friction surface 23 of the liner at the same side of the friction shell B. The friction surfaces 123 of the shoes interfit with the V shaped friction surfaces 23, so as to limit movement of the shoes to a direction longitudinal of the gear. On the inner side each shoe is laterally enlarged, as indicated at 31. The enlargement 31 of each shoe has a wedge face on the forward side thereof, the wedge face of the shoe E being indicated by 129, and that of the shoe F being indicated by 130. Both of the wedge faces 129 and 130 of the shoes are of V shaped section, so as to interfit with the wedge faces of the wedge block D and prevent relative vertical displacement of the shoes with respect to the wedge block. The wedge face 129 is correspondingly inclined to the wedge face 29, and the wedge face 130 is correspondingly inclined to the wedge face 30, of the wedge block, to properly co-operate therewith.

The main spring resistance which, as illustrated, comprises five members includes the inner or central member G and four outer members H, the outer members H being arranged in pairs at opposite sides of the member G. The entire spring resistance, including the members G and H, are disposed within the spring cage A. The inner member G of the spring resistance comprises a light inner coil and a heavier outer coil, the two coils having their front and rear ends bearing respectively on the spring follower disc K, and an inwardly extending hollow boss 32, on the end wall 19 of the cage A. The spring follower disc K bears directly on the inner ends of the enlargements 31, of the two friction shoes E and F. As hereinbefore pointed out, the outer members H of the spring resistance are arranged in pairs at both sides of the member G, the two members of each pair being disposed above and below the central rib 21 of the corresponding side wall of the cage. Each member of the pair of spring resistance elements H includes an inner light coil and an outer heavier coil, both coils having the rear ends thereof bearing on the end wall 19 of the cage, and the front ends bearing directly on the end abutment face 26 of the corresponding liner C.

The entire mechanism is held assembled and of uniform over all length by the retainer bolt J which has the head thereof disposed within the hollow boss 32 and is anchored to the wedge block D by the usual nut. In addition to holding the mechanism assembled, the retainer bolt also serves to maintain the spring resistance G under initial compression. Compensation for wear of the various friction and wedge faces of the mechanism is had by the expansive action of the spring resistance G which, as pointed out, is under initial compression, the tendency of the spring resistance G to expand, urging the friction shoes forwardly against the faces of the wedge block, holding the shoes in frictional contact with the liners. The parts are so proportioned that when assembled the four outer members H of the spring resistance will also be under initial compression.

In assembling the mechanism, the four outer spring members H, are inserted within the spring cage A, and the liners are then assembled with the spring cage and friction shell by engaging the lugs 27 of the liners C, in back of the walls 20 of the cage, and entering the ribs 24 in the seats 22 of the side walls of the friction shell B. The central spring member C is then placed within the spring cage by inserting the same through the friction shell. The friction shoes, wedge block and spring follower disc K are then inserted within the friction shell and the parts secured by the retainer bolt J.

The operation of my improved shock absorbing mechanism, assuming a compression stroke, is as follows:

The main follower 15 and spring cage A are moved relatively toward each other. The main follower 15 carries the wedge block D inwardly toward the spring cage A, forcing the friction shoes E and F inwardly also while wedging the same apart. Due to the friction created between the friction surfaces of the shoes and the liners C, by the wedging action, there is a tendency of the liners C to be carried rearwardly in unison with the shoes. The friction shell B will thus be carried inwardly of the mechanism, also with the wedge block and friction shoes. During the described action all of the spring resistance elements, including the central member G, and the four outer members H, will be compressed, the outer members H being directly compressed by the action of the liners and the central coil being compressed by the inward movement of the friction shoes. As will be evident, a substantially free spring resistance is thus offered during the first part of the compression stroke of the mechanism. The free spring compression of the mechanism will continue until the inward movement of the friction shell B, with respect to the cage A, is limited by the friction shell engaging the front end of the cage. Upon movement of the shell B being thus limited there will be no further compression of the four members H of the spring resistance. Due to the continued inward movement of the main follower 15, with respect to the cage A, the friction shoes will be forced inwardly of the friction shell during the remainder of the compression stroke, the friction shoes sliding on the friction surfaces of the liners C. During the relative movement of the friction shoes and liners, the inner member G only of the main spring resistance, will be compressed. The described action will continue either until the actuating force is reduced or the main follower comes into engagement with the front end of the friction shell B, whereupon further compression of the springs is prevented, the actuating force being transmitted directly through the friction shell and spring cage, these members acting as a solid column load transmitting member.

During release, when the actuating force is reduced, the expansive action of the spring resistance members G and H will force the parts outwardly, the central spring member G forcing the shoes outwardly, while the four outer members H force the friction shell outwardly through the medium of the liners C. During the first part of the releasing action, the friction shell B and friction shoes E and F, and the wedge block D, will be carried out substantially in unison. Movement of the friction shell will be arrested by engagement of the lugs 27 of the liners C with the abutment walls 20 of the cage A, whereupon the central member G of the spring resistance will force the friction shoes outwardly with respect to the shell B until movement thereof is limited by the retainer bolt J, which co-operates with the wedge block D. It will be evident that my improved shock absorbing mechanism affords relatively high free spring capacity, which adapts the same specially for use in connection with passenger equipment, the free spring action being available to absorb the usual shocks in ordinary service, and the heavier frictional resistance being available to absorb unusually heavy shocks. The arrangement of springs within the cage makes use of the maximum available spring space, thus making it possible to employ maximum capacity spring resistance means, which is of great importance in connection with passenger service.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a spring cage; of a friction shell anchored to the cage for limited relative movement thereto; friction means co-operating with the shell and relatively movable thereto; and spring resistance means opposing relative movement of the shell and cage, said spring resistance means including a spring element co-operating with the friction means and additional spring elements directly opposing movement of the shell, said spring elements cooperating with the friction means alone opposing relative movement of the friction means and shell after relative movement of the shell and cage has been arrested, and said additional spring elements having their compression limited when movement of the shell is arrested.

2. In a friction shock absorbing mechanism, the combination with a spring cage; of a friction shell having a lost motion connection with the cage, said lost motion connection limiting relative movement of the shell and cage; friction means co-operating with the shell, said friction means and shell being relatively movable; and spring resistance means within the cage, including a central spring opposing movement of the friction means inwardly of the cage, and four additional spring elements disposed about the central spring, said additional elements directly resisting relative movement of the shell and cage.

3. In a friction shock absorbing mechanism, the combination with a spring cage open at one end; of a friction shell, said shell having interior limiting lugs at the open end thereof; liners detachably secured within the shell, said liners having rearward extensions engaging within the cage, said extensions having anchoring means thereon engaging in back of said limiting lugs; friction elements co-operating with the liners; a pressure transmitting member having wedging engagement with the friction elements; and spring resistance means within the cage opposing relative movement of the shell and cage, a part of said spring resistance means alone opposing inward movement of the friction elements with respect to the shell, when relative movement of said cage and shell is arrested.

4. In a friction shock absorbing mechanism, the combination with a spring cage having limiting stops thereon; of a friction shell, said shell and cage being relatively movable; a lost motion connection between the shell and cage, limiting the extent of relative movement of the shell and cage, said lost motion connection including opposed interior liners detachably secured to the shell, said liners having extensions telescoped within the cage and engaging the limiting stops of the cage to limit outward movement of the shell; friction elements having sliding frictional engagement with the liners; pressure transmitting means having wedging engagement with the friction elements; and spring resistance means within the cage, including a central member and a plurality of members disposed about said central member, said central member being interposed between the spring cage and friction elements, and the remaining members of said spring resistance bearing on said liner extensions.

5. In a friction shock absorbing mechanism, the combination with a spring cage; of a friction shell; liners for the shell, said liners and shell having shouldered engagement to detachably secure the liners to the shell and hold the same against relative longitudinal movement; interengaging means on the liners and cage, providing a lost motion connection for anchoring the shell to the cage for limited relative movement thereof; friction shoes bearing on the liners; pressure transmitting wedge means movable relatively to the cage for spreading the shoes apart to place the liners under lateral pressure and maintain the same in assembled relation with the shell; spring resistance means directly opposing movement of the liners inwardly of the shell, and additional spring resistance means opposing movement of the friction shoes toward the cage, said last named spring resistance means being under initial compression to force said shoes against the wedge to thereby maintain the shoes spread apart and hold the liners secured to the shell.

6. In a friction shock absorbing mechanism, the combination with a spring cage; of a friction shell; liners detachably secured to the shell and having shouldered engagement with the cage to provide a lost motion connection limiting relative movement of the shell and cage to less than the full compression stroke of the mechanism; friction means co-operating with the shell, said friction means and shell being relatively movable; and spring resistance means within the cage, including a central spring opposing movement of the friction means inwardly of the cage, and four additional spring elements disposed about the central spring.

In witness that I claim the foregoing I have hereunto subscribed my name this 3rd day of September, 1927.

JOHN F. O'CONNOR.